(12) United States Patent
Reardon

(10) Patent No.: US 12,498,849 B2
(45) Date of Patent: *Dec. 16, 2025

(54) DRAG AND DROP INTERACTIONS FOR AN OBJECT TRACKING SOFTWARE APPLICATION

(71) Applicants: Atlassian Pty Ltd., Sydney (AU); Atlassian US, Inc., San Francisco, CA (US)

(72) Inventor: Alexander James Reardon, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/773,515

(22) Filed: Jul. 15, 2024

(65) Prior Publication Data

US 2024/0370158 A1   Nov. 7, 2024

Related U.S. Application Data

(63) Continuation of application No. 17/956,586, filed on Sep. 29, 2022, now Pat. No. 12,039,160.

(51) Int. Cl.
| | |
|---|---|
| *G06F 3/0486* | (2013.01) |
| *G06F 3/0482* | (2013.01) |
| *G06F 9/451* | (2018.01) |
| *G06F 9/54* | (2006.01) |
| *G06T 13/00* | (2011.01) |

(52) U.S. Cl.
CPC .......... *G06F 3/0486* (2013.01); *G06F 3/0482* (2013.01); *G06F 9/451* (2018.02); *G06F 9/542* (2013.01); *G06T 13/00* (2013.01)

(58) Field of Classification Search
None
See application file for complete search history.

(56) References Cited

U.S. PATENT DOCUMENTS

| | | | | |
|---|---|---|---|---|
| 6,002,402 A | * | 12/1999 | Schacher | G06F 3/0481 715/810 |
| 2006/0156314 A1 | * | 7/2006 | Waldorf | G06F 9/4484 712/E9.082 |

(Continued)

*Primary Examiner* — Craig C Dorais
(74) *Attorney, Agent, or Firm* — Brownstein Hyatt Farber Schreck, LLP

(57) ABSTRACT

Example methods and computer programs for performing drag and drop (DND) operations are disclosed. The method includes detecting, at an adapter component of a DND library, commencement of a DND operation on a selected draggable entity in a web browser, and communicating, by the adapter component, a message to a core component of the DND library indicating the commencement of the DND operation and including information about the selected draggable entity. The method further includes activating, by the core component, API event listeners to detect API events fired by a native DND API of the web browser, detecting the API events, and computing drop targets in the web browser for the selected draggable entity. The method further includes firing, by the core component, core events, detecting, by the adapter component, the core events, and performing operations by the adapter component, in response to the core events.

20 Claims, 10 Drawing Sheets

(56) References Cited

U.S. PATENT DOCUMENTS

| | | | |
|---|---|---|---|
| 2011/0239306 A1* | 9/2011 | Avni | G06F 21/62 |
| | | | 726/26 |
| 2013/0191759 A1* | 7/2013 | Bhogal | G06F 3/048 |
| | | | 715/752 |
| 2015/0370542 A1* | 12/2015 | Wang | G06F 9/542 |
| | | | 717/114 |

* cited by examiner

DRAG AND DROP INTERACTIONS FOR AN OBJECT TRACKING SOFTWARE APPLICATION

CROSS-REFERENCE TO RELATED APPLICATION(S)

This application is a continuation patent application of U.S. patent application Ser. No. 17/956,586, filed Sep. 29, 2022 and titled "Drag and Drop Interactions for an Object Tracking Software Application," the disclosure of which is hereby incorporated herein by reference in its entirety.

TECHNICAL FIELD

Aspects of the present disclosure are directed to graphical user interfaces and in particular to systems and methods for providing drag and drop functionality in a graphical user interface of an object tracking software application.

BACKGROUND

Background information described in this specification is background information known to the inventors. Reference to this information as background information is not an acknowledgment or suggestion that this background information is prior art or is common general knowledge to a person of ordinary skill in the art.

Graphical user interfaces allow users to interact with a software program or application. Traditionally, users may enter text or provide other user input to various regions or fields of a graphical user interface. Menu controls, buttons, or other similar items may also be used to provide input through a graphical user interface. Using some traditional graphical user interfaces, it can be difficult or inefficient to provide input using traditional fields or menu controls. The techniques described herein can be used to improve the effectiveness and efficiency of graphical user interfaces, particularly for object tracking software applications.

SUMMARY

Example embodiments described herein are directed to a computer-implemented method. The method including detecting, at an adapter component of a drag and drop library, commencement of a drag and drop operation on a selected draggable entity in a webpage displayed in a web browser. The adapter component is configured for the type of the selected draggable entity. The method further includes communicating, by the adapter component, a message to a core component of the drag and drop library. The core component independent of the adapter component. The message indicating the commencement of the drag and drop operation and including information about the selected draggable entity. The method further includes activating, by the core component, one or more application programming interface (API) event listeners to detect one or more API events fired by a native drag and drop API of the web browser, detecting, by the core component, the one or more API events, and in response to detecting the one or more API events, computing, by the core component, one or more drop targets in the web browser for the selected draggable entity. The method further includes firing, by the core component, one or more core events in response to computing the one or more drop targets. The method also includes by the adapter component, receiving the one or more core events, and forwarding the one or more core events to one or more event handlers initialized by the adapter component. The one or more event handlers are configured to receive the one or more core events and perform one or more operations in response to the one or more core events.

Some example embodiments are directed to a computer processing system including a processing unit, a communication interface, and a non-transitory computer-readable storage medium storing instructions. When these instructions are executed by the processing unit, they cause the processing unit to perform the computer-implemented method described above.

Still other example embodiments are directed to a non-transitory storage medium storing a drag and drop library. The drag and drop library includes a core component and an adapter component independent of each other. When the core component is executed by a processing unit, it causes the processing unit to: receive a message indicating commencement of a drag and drop operation on a selected draggable entity in a web browser, in response to receiving the message, activate one or more API event listeners to detect one or more API events fired by a native drag and drop API of the web browser, detect the one or more API events, in response to detecting the one or more API events, compute one or more drop targets in the web browser for the selected draggable entity, and fire one or more core events in response to computing the one or more drop targets. When the adapter component is executed by the processing unit, it causes the processing unit to: detect the one or more core events; and perform one or more operations in response to the one or more core events.

Figure 1A:
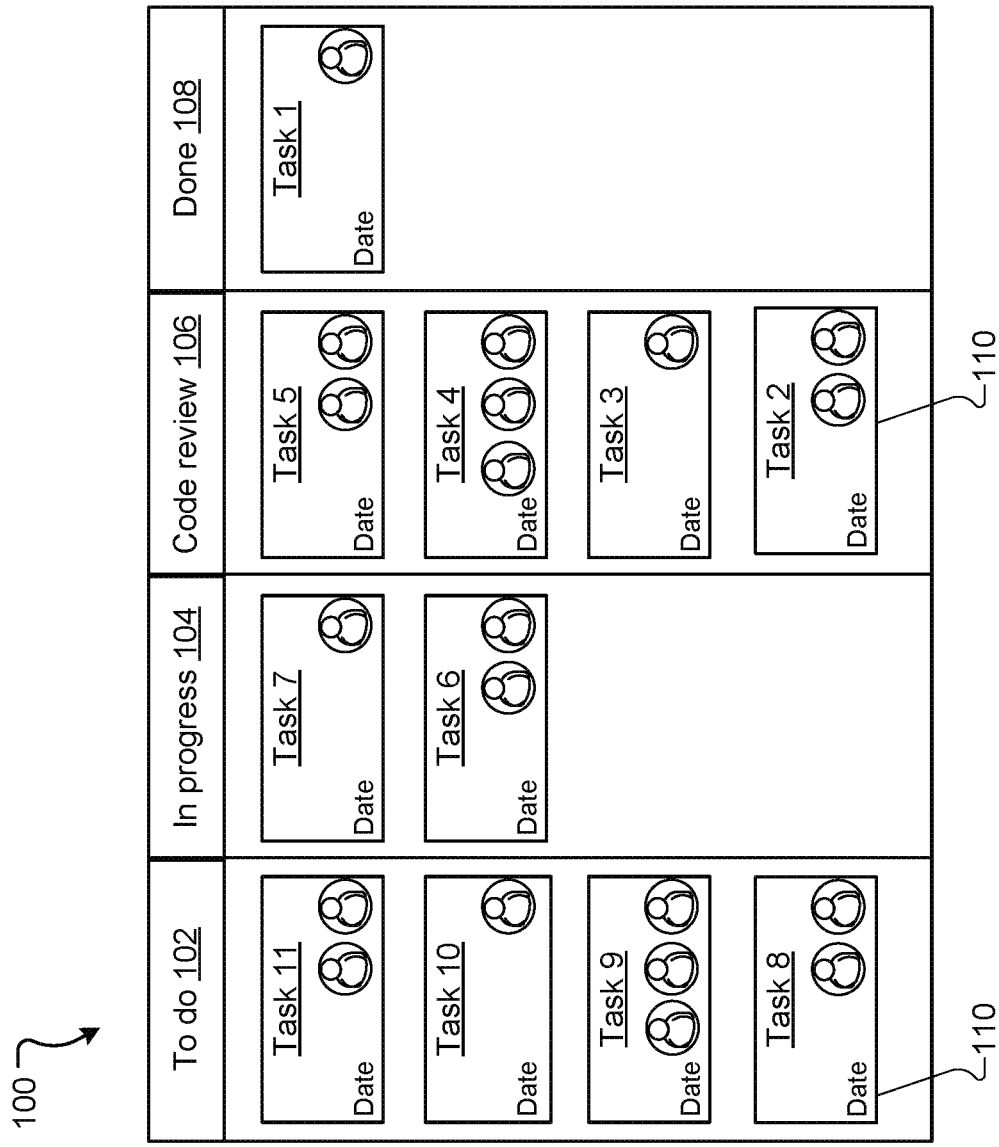
FIG. 1A is a diagram of an example virtual board.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Drag and drop (DND) is an interaction functionality applied to graphical user interfaces and in particular, to web pages that allows users to move elements on a web page. In particular, it is an interaction functionality that allows a user to select an element, drag the element to a desired "drop location" (also referred to as a "drop target") and then drop the element at that location.

Generally speaking, there are a few DND programs that can be used to provide this functionality to web pages. However, it is desirable to have an improved DND program that addresses at least some of the limitations of conventional DND programs.

For instance, the presently disclosed DND system is described with reference to object tracking systems and or webpages that display virtual boards. However, it will be appreciated that this is merely exemplary and that the presently disclosed DND system can be used with any computer programs or systems that create webpages in which elements (also interchangeably called objects in this disclosure) can be dragged and dropped.

Overview

Generally speaking, various computing applications and systems (such as object tracking systems) provide mechanisms for creating and rendering objects, object states, and transitioning objects between states within a virtual board environment.

As used herein, an object tracking system (or object tracking software application) is any system (or application) that at least facilitates the tracking of objects between states and the visualization of objects in object states by generation, rendering and display of virtual boards.

One example of an object tracking application (as referred to in the present context) is Trello. Trello allows users to create objects in the forms of cards or objects and object states in the form of lists or columns. In order to change an object state in Trello an object is transitioned from one list to another. For example, a Trello user may set up a virtual board (a list of lists) having one or more lists such as "To Do," "In Progress," and "Completed." A user may then create cards in respect of particular tasks that need to be done and add them to the "To Do" list: for example, a "grocery shopping" card, a "washing up" card, an "organize house party" card etc.

A further example of what the present disclosure refers to as an object tracking application is Jira. Jira allows users to create objects in various forms, for example issues or, more generally, work items. A work item in Jira is an object with associated information and an associated workflow, that is, a series of states through which the work item transitions over its lifecycle. Any desired workflow may be defined for a given type of work item. Further examples of what the present disclosure refers to as an object tracking application are Bugzilla, and Asana, to name but a few.

Object tracking applications such as those described above often provide graphical user interfaces for displaying the current state of objects maintained by the application and allowing users to move objects (e.g., tasks in Trello, work items in Jira) between states (or lists). In both Trello and Jira such graphical user interfaces are referred to as virtual boards. A board (also interchangeably referred to as a virtual board herein) is generally a tool for workflow visualization. Generally speaking, a board includes cards, columns, and/or swimlanes to visualize workflows in an effective manner. Each card in the board may be a visual representation of an object (e.g., task in Trello, work item in Jira) and may include information about the object, such as deadlines, assignee, description, etc. Each column in the board represents a different state (e.g., stage of a workflow in Jira or a list in Trello). The cards typically progress through the columns until their completion. Swimlanes are horizontal lanes that can be used to separate different activities, teams, classes or services, etc.

FIG. 1A provides an example virtual board 100, which shows a workflow to track software development projects. In particular, the board 100 includes four lists or columns, each corresponding to a workflow state: TO DO 102; IN PROGRESS 104; CODE REVIEW 106; and DONE 108. Board 100 also includes several cards 110, i.e., visual representations of objects (work items in the present context), each of which is in a particular column according to the current state of the object. Each card may include information about the underlying object—e.g., it may include an object title and description, a date by which the object is to be completed or was completed, and information about one or more users assigned to complete the object. It may include other content as well including, but not limited to: text; icons; pictures; and video. The card contents often defines the size of the card 110 that is rendered—the more card content the larger the card size. Further, it will be appreciated that card width may be fixed or may change based on the number of columns in the board 100 and/or the screen size. The card height on the other hand may change based on the content of the card.

Typically, the cards/objects 110 displayed in a virtual board are interactive and/or 'draggable'. That is, these cards can be moved from one location to another in the virtual board based on user input control, e.g., via a mouse, or touchscreen. Further, the columns in the virtual boards are themselves 'draggable' and also 'droppable'. That is, a user can re-arrange the lists/columns in any desired order by dragging and dropping the lists on the user interface and the area of the user interface occupied by a given column is a droppable area in which draggable cards/object 110 can be dropped. Accordingly, users can move cards around within a particular column, for example by selecting and dragging or other means, to change the order of cards in the column. When a card is moved within a list, the state of the card does not change. For example, a card that is positioned at the top of a list can be moved to a chosen position lower down that same list such that the state of the card does not change, only the position of the card within the state is changed.

Further, users can transition cards between columns/lists, for example by selecting and dragging, from its current column to another one. For example, once the user has completed task 11 (in the virtual board 100 shown in FIG. 1), the user can select and drag the corresponding card from the "To Do" list and drop it into the "Completed" list. If the user has started but not completed work on this task they can instead select and drag the corresponding card from the "To Do" list to be dropped into the "In Progress" list.

Figure 1B:
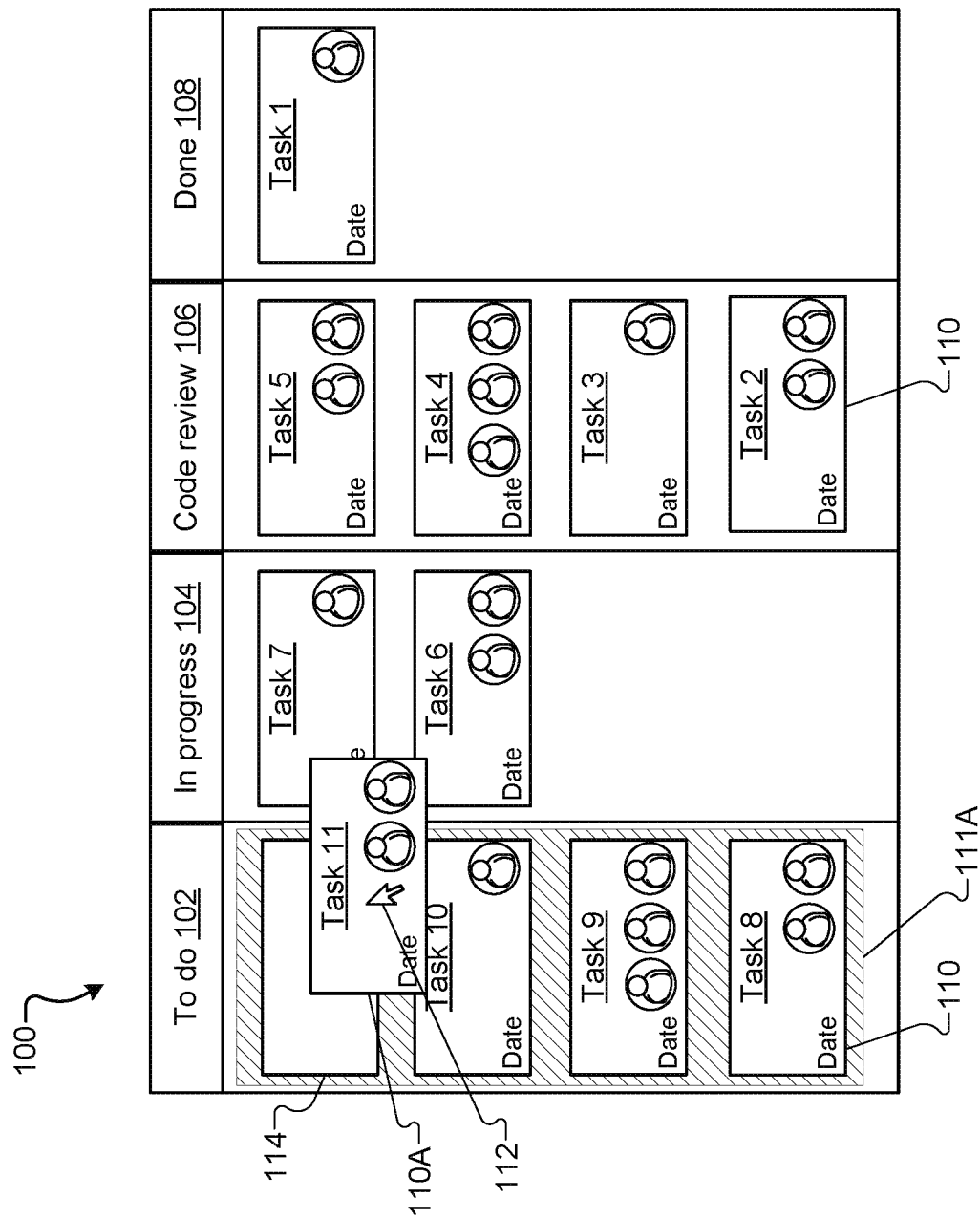
FIGS. 1B-1D are diagrams showing an example virtual board during a conventional DND operation at three different points in time.
Figure 1C:
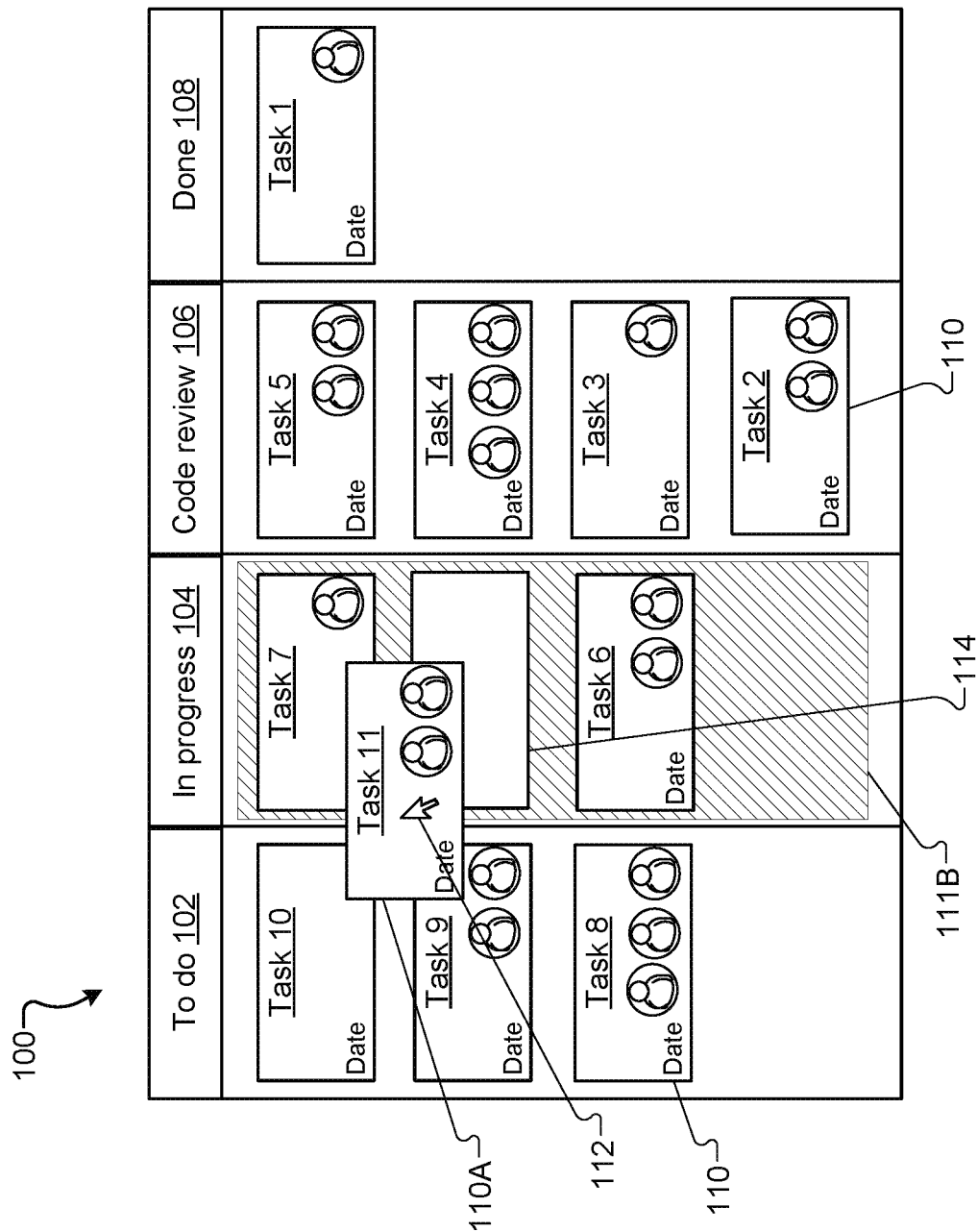
Figure 1D:
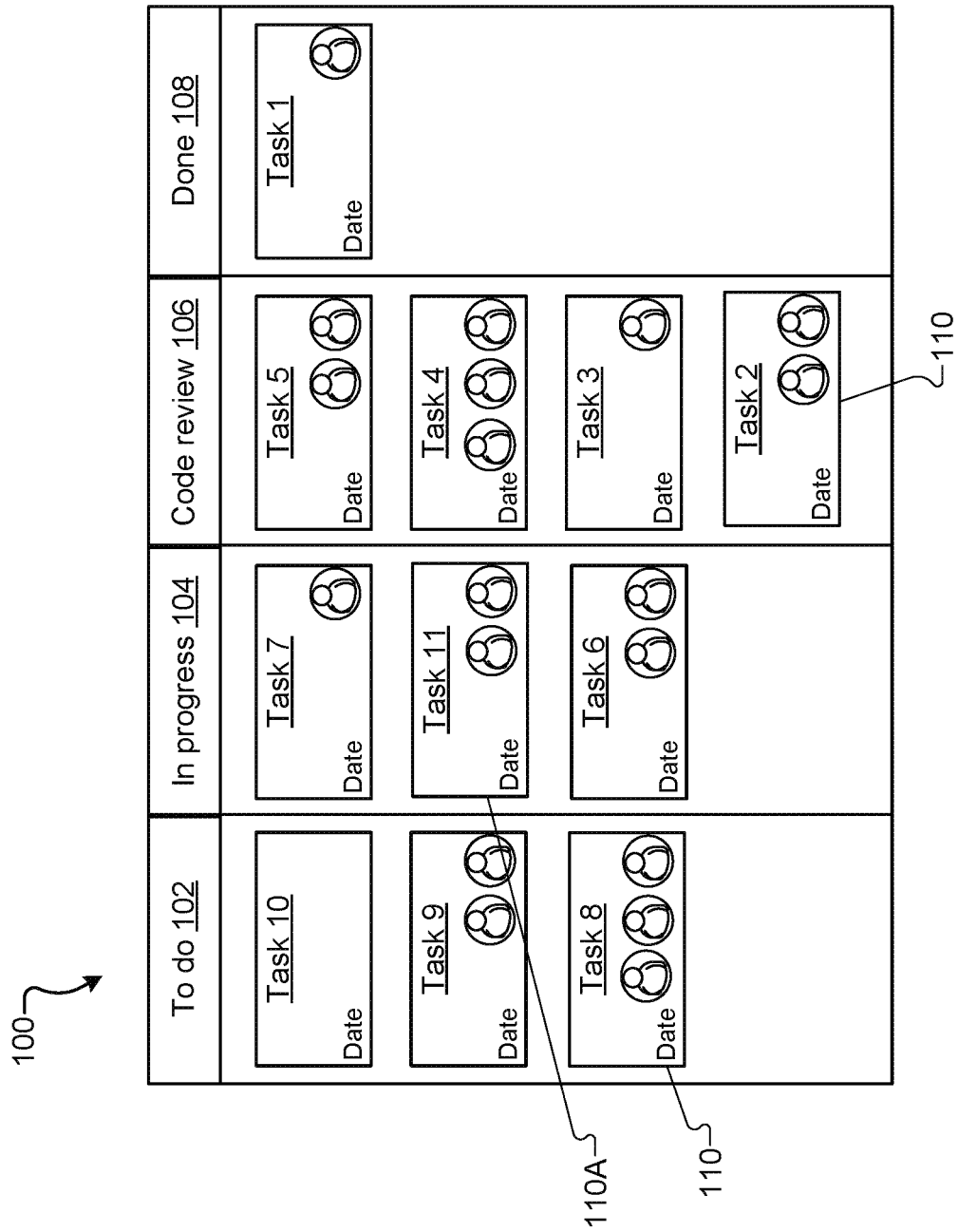

Typically, when a user drags a card from one location to another using an input control, the transition of the card from the first location to the second is animated and other objects in the destination can be animated to move out of the way of the dragged object so that it can be dropped at the desired destination. FIGS. 1B-1D depict this animation.

In particular, FIG. 1B, shows the board 100 at a first point in time, where the user has initiated a DND operation on card 110A by selecting card 110A with a cursor 112 and dragging card 110A from its original position in column 102. The cursor 112 at this stage still hovers over a droppable area 111A overlaying column 102 and has not yet moved into a droppable area overlaying another list on the board. At this stage, the user interface shows card 110A is moved (e.g., by a distance that corresponds to the distance by which the cursor has moved from its original position when the drag operation started to its current position), and places a placeholder area 114 (also known as a "non-visible" object) that may be the same size as card 110A in the original or home position of card 110A.

In some cases, the placeholder area 114 is displayed in the original position from the moment the card dragging operation commences and until the cursor 112 is detected to be outside the droppable area of that column, i.e., column 102. This display of the placeholder area 114 allows a user to remember where the card 110A was originally positioned and also indicates the destination position of card 110A if the user were to end the drag operation at this point.

FIG. 1C, shows the board 100 at a second point in time, where the user has dragged card 110A such that cursor 112 is now hovering over a droppable area 111B overlaying column 104. Once cursor 112 passes from the droppable area 111A overlaying column 102 to the droppable area 111B overlaying column 104, the user interface shows a corresponding placeholder area 114 in column 104 at the position of the cursor 112. If other cards were present in this position, these are pushed down by a distance corresponding to the height of the placeholder area (e.g., see card representing 'TASK 6' that is pushed down). In some cases, the placeholder area 114 may be removed from column 102 when it is displayed in column 104. In other cases, the placeholder area may be displayed in both the original or home location and the destination location such that the user may easily discern the destination and original location of the card in case the user wishes to proceed with the operation or not.

FIG. 1D shows board 100 at a third point in time, where the user has dropped (that is, deselected by cursor 112) card 110A after cursor 112 has moved to hovering over the droppable area 111B overlaying list 104 between the location of cards representing 'TASK 7' and 'TASK 6'. Card 110A is therefore transitioned to list 104 and dropping card 110A on this list completes the DND operation. This completion of the DND operation is also referred to as a card transition.

The animation sequence described above improves user experience when dragging and dropping objects within a virtual board and allows users to feel like they are moving physical objects around.

Typically, to provide this sort of animation of a DND operation, a number of systems or modules are required. In particular, a system is required that can detect a DND operation—i.e., when it starts, what the user is doing during the operation, and when it stops. Another system may be required that determines what should be done during the detected DND operation at different points in time—e.g., when the operation is initiated, while the user is dragging an element, when the operation is terminated, etc. In addition, a third system may be required that performs the actual animations during a DND operation. Oftentimes, a single DND program may be provided to perform two or more of these functions. Such a DND program is often referred to as a library that includes a collection of files, programs, routines, scripts, or functions and is often provided along with a web page. The DND library specifies the calculations to be performed and the animations to be applied during the DND operations. When the web page is initially requested by a web browser, the web page content, and the DND library are provided to the web browser. The web browser then renders a graphical user interface based on the web page content, downloads and executes the DND library. Methods or functions from the library are then executed whenever a user selects a draggable object, drags the object, and drops the object. Accordingly, the DND library generally helps the web browser render the transition animations described with reference to FIGS. 1B-1D.

There are a number of issues with conventional DND libraries. First, such DND libraries typically include code for all possible scenarios and moveable entities. For example, such libraries may include code for handling DND operations (i.e., detecting, for moving elements in lists, for moving files (from outside the webpage) into drop targets, and moving other types of objects on a webpage. Because of this, conventional DND libraries are usually very large (about hundreds of kilobytes). Because of their size and because the web browser has to download the library and load it before a webpage becomes interactive, the typical time to interactive (TTI)—i.e., time taken for a webpage to be usable and respond to user input is usually between 100-800 milliseconds (ms).

Most web browsers usually also provide some form of basic DND functionality—e.g., detecting DND operations and providing methods for performing basic animations during the process. However, most web developers refrain from using this native browser DND functionality because it often times generates inconsistent results, has bugs, lacks support for mobile browsers and is generally complex to use. Further, most native DND programs provide poor user experience as they provide basic types of animations and may not provide animations customized for different types of draggable entities such as lists, cards, etc.

To address one or more of these issues, aspects of the present disclosure provide a new and improved DND library. In particular, aspects of the present disclosure provide a DND library that is only a few kilobytes in size. Further, the library is not only smaller in size than previously known libraries, but also much simpler than previously known libraries. Because of its smaller size and simplicity, the DND library presently disclosed significantly reduces load times and also reduces browser-processing requirements when performing DND operations.

To maintain its size and simplicity, the library utilizes the native browser DND API for detecting DND events, handling input types, and collisions (i.e., when two or more objects are being dragged simultaneously), and includes a core component that binds the DND events detected by the native browser DND API to one or more methods or functions in response to the detected events. Generally speaking, the core component provides an abstraction layer over the native browser DND API to alleviate some of the complexity and poor user experience associated with the native browser DND API, while still using it to drive animations associated with DND operations. In addition to the core component, the DND library of the present disclosure includes a number of adapter components. The adapter components are generally opinionated and "adapt" or "teach" the core component to perform methods or functions depending on the type of entity being dragged and dropped. Depending on the types of entities a developer wishes to provide DND functionality for, they may select one or more of the adapters. As used herein entities are different types of internal nodes (e.g., text, images, elements, etc.) or external nodes (e.g., files, folders, internal nodes from another webpage, etc.).

In addition to the core and the adapters, the present disclosure describes one or more add-on components that can be used to add date or information to the draggable components or drop targets. In other cases, add-on components may provide additional functionality that may be useful for certain types of DND operations, entities, or webpages and can be added if required. For example, an add-on component may provide a scrolling functionality in a list when a user is dragging an object in a long list. In another example, an add-on component may identify the top or bottom edge of an object that a cursor is over during a DND operation. This may be useful in the case of virtual boards, e.g., to identify the drop target between cards already present in a list that is also a potential drop target.

Such a plug-in or modular system allows the core component to be extended into a wider set of use cases, meanwhile allowing web developers to only select and consume components of the library they will need for a particular webpage. For example, if a developer only wishes to allow users to drag and drop files from outside the webpage to a large drop target in the webpage, the web developer may select an adapter component for a file entity type and forgo selecting any other adapters or add-on components. Alternatively, if the web page is a virtual board with draggable and droppable lists and cards, the web developer may select one or more adapter components that are suitable for card and/or list entity types and may select one or more add-ons, but may not select other adapters.

Further still, the DND library can be loaded after the web browser loads the page. In some examples, the DND library can be lazy loaded and executed once the webpage has completed loading. In other examples, the DND library can be conditionally loaded when a trigger condition is detected—e.g., when the user performs a particular action, after a particular period of time has elapsed, etc.

These and other aspects of the present disclosure will be described in the following sections.

Example System

In the following, a networked environment and computer processing system configurable to implement various features and techniques described herein are described. Following this, example computer implemented methods for loading webpages with presently disclosed DND libraries will be described.

Figure 2:
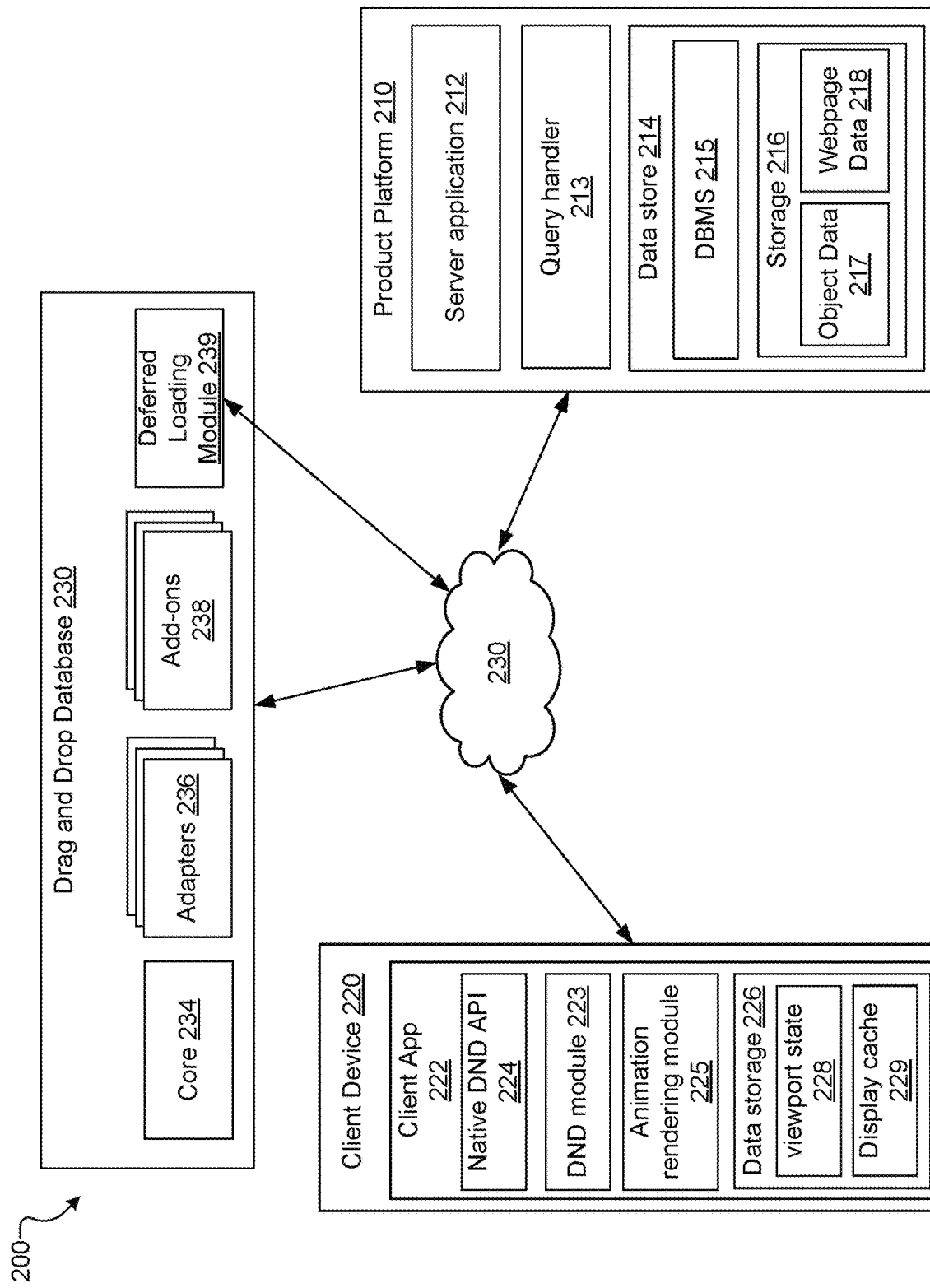
FIG. 2 is a block diagram of a networked environment in which aspects of the present disclosure can be implemented.

FIG. 2 illustrates an example networked environment 200 in which the various operations and techniques described herein can be performed. Specifically, FIG. 2 illustrates the various systems and modules involved in providing a modular DND library to a web page, configuring a webpage with the modular DND library, and to load webpages with such modular DND libraries according to embodiments of the present disclosure. Networked environment 200 includes a product platform 210, a client device 220, and a DND database 230, which communicate via one or more communications networks 240.

The product platform 210 may be a system or set of systems configured to provide any type of service/perform any type of operations for clients. In order to provide such services or operations, product platform 210 stores data in a data store 214. As one example, product platform 210 may be an issue tracking system used (inter alia) to create, manage, and track issues. In another example, the product platform 210 may be an object tracking system used to create, manage, and track objects. Product platform 120 may, however, provide other services/perform other operations.

In the present example, product platform 210 includes a server application 212, and a query handler 213.

Server application 212 is executed by a computer processing system to configure that system to provide server-side functionality to one or more corresponding client applications (e.g., client application 222 as discussed below). Further, the server application 212 may be configured to receive data update instructions from the client devices 220 (e.g., based on one or more drag and drop interactions performed by users on displayed web pages such as moving a card from one list to another, adding a file, moving a card vertically in a given list, etc.) and may be configured to perform actions based on these instructions, e.g., it may update the main data store 214 based on the received data update instructions.

Server application 212 comprises one or more application programs, libraries, APIs or other software elements that implement the features and functions that are described herein. For example, where the client application 222 is a web browser, the server application 212 is a web server such as Apache, IIS, nginx, GWS, or an alternative web server. Where the client application 222 is a specific/native application, server application 212 is an application server configured specifically to interact with that client application 222.

In some embodiments, the server application 212 may be provided with both web server and application server applications.

The query handler 213 is configured to receive a web page request from a client device 220 and respond to that web page request with data defining the structure (e.g., styling information), content (e.g., the actual data to be displayed on the web page), and behavior (e.g., interactive components) of the web page. In addition, the query handler 213 is configured to provide DND library information to the requesting client device along with the webpage data. To do this, the query handler 213 is configured to identify the requested web page, requesting client device 220 and in some examples a user identifier of the user making the request, retrieve the web page data for the requested web page, and communicate the structure and content to the client device 220. It also communicates a list of JavaScript components and libraries associated with the webpage either as part of a HTML head or the HTML body to the requesting client device.

In certain embodiments, product platform 210 is a multi-tenanted system: i.e., server application 212 serves multiple tenants. In these embodiments, any request received by the product platform 210 is associated with a particular tenant—e.g., via a tenant identifier. For example, a given request may be received from/initiated by a particular account, and the identifier for that account will be associated with a tenant identifier.

Data store 214 includes one or more database management systems (DBMS) 215 and one or more data storage systems 216 (operating on one or multiple computer processing systems). Generally speaking, DBMS 215 receives structured query language (SQL) queries from a given application (e.g., server application 212), interacts with data storage system 216 to read/write data as required by those queries, and responds to the relevant application with results of the query.

The storage 216 may store any data relevant to the services provided/operations performed by the server application 212. In the present examples, such data includes object data (i.e., data associated with objects) 217 and webpage data 218. In this context, an object is a logical grouping of data. Data 217 for objects may be stored across multiple database records (e.g., across multiple database tables) that are related to one another by one or more database keys (for example object identifiers and/or other identifiers).

By way of specific example, where product platform 120 is an issue tracking system, the object data 217 may be related to issues that are maintained and managed by the system. In this case, various data can be maintained in respect of a given issue, for example: an issue identifier; an issue state; a team or individual to which the issue has been assigned; an issue description; an issue severity; a service level agreement associated with the issue; a tenant to which the issue relates; an identifier of a creator of the issue; a project to which the issue relates; identifiers of one or more issues that the issue is dependent on; identifiers of one or more issues that depend on the issue; identifiers of one or more other stakeholders; and/or other data.

In another example, where the product platform 210 is an object tracking system, in addition to object data (associated with individual tasks), board data may be stored.

Board data related to virtual boards maintained by the platform 210. This includes, e.g., for each virtual board, a board identifier, a board name, a board description, a creator of a board, number of columns and/or swimlanes in the board, names of columns and/or swimlanes in the board, a list of objects that are part of the board and a list of assignees associated with those objects. As used herein, such board data is referred to as board state data. The board state data may be stored in one or more tables or storage devices as board state records, where each record corresponds to a given board.

As described above, in addition to object data, the storage 216 further stores web page data 218. For instance, for each web page hosted by the product platform 210, the storage 216 may store static webpage data, web page CSS data, and executable components—e.g., JavaScript functions that retrieve dynamic object data from object databases, execute one or more functions on the webpage, and/or provide interactivity to the webpage data.

In addition, the webpage data 218 includes a DND library customized for the given webpage. In certain embodiments, the product platform 210 retrieves the core of the DND library and one or more adapters from the DND database 230 depending on the content of the webpage and the type of animation effects required to illustrate the DND operation. In addition to these, web developers may further add customized DND add-ons that can provide additional information to drop targets or draggable elements or perform side effects during a DND operation. These add-ons can be created and stored with the webpage data 218 in storage 216 in relation to a given webpage.

Although the storage 216 is depicted as being part of the main data store 214, the storage 216 may also be maintained as an in-memory cache. Further, one or more of these databases may be maintained as separate entities with their own DBMS.

The applications executed by product platform 210 typically run on multiple computer processing systems. For example, in some implementations each system/sub-system/ module of the product platform 210 may be executed on a separate computer processing system. In other embodiments, multiple (or even all) sub-systems of the product platform 210 may run on a single computer processing system. In certain cases, a clustered server architecture may be used where applications are executed across multiple computing instances (or nodes) that are commissioned/ decommissioned on one or more computer processing systems to meet system demand. For example, the server application 212 may be implemented as multiple nodes connected to the network 240 via a load balancer.

The client device 220 may be any computer processing system which is configured (or configurable) by hardware and/or software to offer client-side functionality. By way of example, suitable client devices may include: server computer systems, desktop computers, laptop computers, netbook computers, tablet computing devices, mobile/smart phones, and/or other computer processing systems.

In some embodiments, client device 220 hosts a client application 222 which, when executed by the client device 220, configures the client device 220 to provide client-side functionality of the object tracking system. This may include, for example, interacting with (i.e., sending data to and receiving data from) server application 212 to render web pages, such as virtual boards, by way of which a user interacts with the server application 212. Such interactions typically involve logging on (or otherwise accessing) server application 212 by providing credentials for a valid account maintained by the product platform 210. Once validated, a user can perform various functions using client application 222, for example requesting web pages, performing drag and drop operations on web pages, communicating data to the server application 212 at the end of drag and drop operations, etc.

Client application 222 may be a general web browser application (such as Chrome, Safari, Internet Explorer, Opera, or an alternative web browser application) which accesses a server application such as server application 212 via an appropriate uniform resource locator (URL) and communicates with the server application via general world-wide-web protocols (e.g., HTTP, HTTPS, FTP). When the client application 222 is a web browser, its main function is to present web resources requested by the user. Further, a given client device 220 may have more than one client application 222, for example it may have two or more types of web browsers.

A web browser has seven main components (not shown)—a user interface, a browser engine, a rendering engine, networking module, user interface backend, JavaScript interpreter, and data storage. The user interface allows users to interact with all visual elements available on a webpage and includes parts of the browser display, such as the address bar (where a user can enter a URL of the webpage the user wishes to view), back/forward buttons, etc. The browser engine organizes actions between the UI and the rendering engine and the rendering engine is responsible for displaying the requested content. When a web page is requested, the rendering engine analyses the received HTML and CSS files and renders the analyzed content on the screen. The user interface backend is used to draw or paint basis widgets like combo boxes and windows and the JavaScript Interpreter is used to parse and execute JavaScript code. The data storage is a persistence layer where the browser saves data locally, such as drag and drop libraries, cookies, etc.

In addition to the above, the client application 222 includes one or more native application programming interfaces (APIs) that are built into the browser and provide native features that can be used by web pages loaded by the browser. In the present case, the client application 222 will include a native DND API 224. The native DND API 224 enables web pages or applications to user DND features in the browser. It will be appreciated that a client application 222 typically includes multiple other native APIs, which do not form part of this disclosure and therefore are not described here.

In some embodiments, the native DND API 224 monitors user interaction with a displayed webpage and defines a number of events related to DND operations, which fire when certain user interactions are detected. Events fired by the DND API 224 are referred to as API events herein. For example, during a DND operation, the native API 224 may fire a "dragstart" event when it detects that a user has selected a "draggable" item and has commenced moving their input control across the user interface. Similarly, it may fire a "dragend" event when it detects that the user has stopped the dragging action and released the selected draggable item at a location other than a valid drop location on the user interface. After "dragstart", the native API 224 may continue to fire "drag" events until it detects that the operation has ended or the draggable item is over a potential drop target. A "drageneter" event may be fired when the API detects that during a dragging operation a cursor has entered a potential drop target, and a "dragleave" event may be fired when the API detects that the cursor has left the potential drop target. Further still, the API may fire a "drop" event when the selected draggable item is dropped on a valid drop target. Table A below summarizes the events, their trigger condition, and the targets of the events.

TABLE A

Summary of DND events

| Event | Trigger | Target of the event |
|---|---|---|
| Drag | A regular event during a DND operation with the latest user pointer information | A draggable element |
| Dragend | The drag has finished (on a valid drop target or not) | A draggable element |
| Dragenter | The user is moving the drag into a new potential drop target | A potential drop target element |
| Dragleave | The user has left a drop target (generally fires after "dragenter" for entering into a new drop target) | A potential drop target element |
| Dragover | Same as "drag", but fires on the current drop target | A potential drop target element |
| Dragstart | A drag operation is starting | A draggable element |
| Drop | A draggable element was successfully dropped on a drop target | A valid drop target |

In addition to this, when a webpage is loaded on the client device 220 according to aspects of the present disclosure, the client app 222 may include two additional modules-a DND module 223 and an animation rendering module 225. The DND module 223 is created when the DND library (including at least the core and one or more adapters) is downloaded by the client application 222 for a webpage and executed. The DND module 223 may be configured to listen to API events, bind these events to functions, detect valid drop targets, manage the state of the elements during a DND operation, and communicate with the animation rendering module 225.

The animation rendering module 225 is configured to receive instructions from the DND module 223 and render animations on the display of the client device 220 in response to those instructions. In particular, the animation rendering module 225 may be configured to receive instructions to highlight drop targets, change the appearance of a selected object, create a dragging object that can be attached the cursor and move with the cursor as the user performs a drag, and render an animation when the object is dropped on a valid drop target.

The client application 222 also maintains local data on the client device 220, e.g., in a cache. The local data maintained includes web page data 228 and display cache 229. The webpage data essentially stores the data for a web page displayed on the client device 220. It includes web page data including CSS, HTML, JavaScript components, and the module DND library for the given webpage. The HTML data may include information about all the elements on the webpage including their identifiers and associated properties—e.g., whether the elements are draggable and/or drop targets and if drop targets then what type of draggable elements they would accept.

Different client devices have different display sizes and possibly have different zoom settings—this affects how much of a web page is displayed on a display of the client device at any given point. Further, the size of the web page itself may vary, such that the entire web page is not visible on a display. To keep track of the web page that is currently visible on the client device 220, the client application 222 maintains a display cache 229 that stores data about the objects (i.e., cards and columns/list) that are displayed on the client device at any given point. In particular, it may store identifiers of objects and their position information. As the user scrolls or otherwise moves the web page, additional portions of the web page may become visible and may be added to this display cache 229 and other portions may disappear from the display and be removed from this display cache 229.

It will be appreciated that the user may have multiple web pages open at any given time (e.g., as different tabs in a web browser). In such cases, each tab of the web browser may be considered an individual client application 222 and the client device 220 may have multiple client applications running at the same. Each client application 222 in this case may maintain its own local cache 228 and display cache 229. While the corresponding web page is displayed, a client application 222 maintains the web page data and display cache. Once the web page is closed, the client application 222 may flush its corresponding web page data 228 and display cache 229.

The DND database 230 stores the modular DND library 232 as disclosed herein. In particular, the DND database 230 stores the core 234 of the DND library 232 and also stores a plurality of adapters 236. The core 234 provides an abstraction layer over the native DND API 224 of the client application 222. In particular, the core 234 includes one or more event listeners that are executed during a DND operation and are configured to listen to one or more DND events generated by the native DND API 224. In addition, the core includes DND event bindings—i.e., statements to bind the events of the native DND API 224 to methods provided by the DND library 232. The event bindings are used to call a corresponding method whenever the event occurs. In addition to event bindings, the core 234 may further provide drop target detection—i.e., determine what object on the webpage the cursor is currently over and whether that object is a valid drop target or not for the object being dragged, and drag state management. In particular, the core 234 uses API events to compute nested drop targets (e.g., where a given drop target such as a card is within another drop target such as a list). For a given browser event (e.g., drag enter), the core 234 recursively searches upwards through the data object model (DOM) of the webpage to find other potential drop targets. According to the browser, only the inner most element, e.g., the card, is the drop target. The core 234 however identifies any other parent drop targets associated with the API event and can publish this information to consumers, e.g., adapters 236.

Each of the adapters 236 is associated with a different draggable entity type and teaches the core how to handle the DND operation for the particular entity type it is associated with. Each adapter may include an event listener that is activated when the webpage includes one or more draggable elements of the entity type supported by the adapter 236. For example, the object adapter may include an API event listener that is activated when the adapter determines that the webpage includes at least one draggable element. Similarly, the file adapter may include an API event listener that is activated when the adapter 236 determines that the webpage includes at least one drop target that accepts files. The API event listeners are used to determine when a drag operation starts. For example, event listeners may be configured to detect 'dragstart' events for a draggable element within a webpage or detect a "dragenter" event with particular characteristics for an entity being dragged into a webpage.

Each adapter 236 is also configured to retrieve data associated with a draggable element once it detects the start of a drag operation and pass this on to the core 234.

During a DND operation, the adapters 236 are also configured to maintain one or more event handlers (not shown) for receiving events from the core component and performing one or more operations/functions in response to the events. For example, the adapter may be configured to initialize or maintain a draggable event handler, one or more drop target handlers, and one or more monitor event handlers. During operation, the adapter 236 is configured to receive events generated by the core and forward these core events to the relevant event handlers.

In addition to the core 234, web developers may select one or more adapters 236 from the database 230 depending on the particular draggable entities in the web page and zero or more add-ons depending on any conditional functionality they would like to add to their webpage. Once decided, the product platform 210 may retrieve the core 234, the selected adapters 236, and the selected add-ons 238 from the DND database 230 and store the customized library in the webpage data 218 for the selected webpage.

In some examples, the product platform 210 may download the customized DND library from the DND database 230 and store it in the data store 214 against the corresponding web page. In other examples, the product platform 210 may simply store a link to the selected core, adapters, and add-ons in the webpage data 218. In such cases, at runtime, the client application 222 can retrieve the core, selected adapters and/or add-ons from the DND database 230 instead of the product platform 210.

In addition, the DND library 232 may include a deferred loading module 239 that enables the loading of the DND library to be deferred. This module 239 can be selected by web developers if they wish to further reduce time to interactive (TTI) on their webpages. In some examples, the deferred loading module 239 is configurable. That is, a trigger condition that causes loading of the DND library can be configured by web developers. For instance, one configurable trigger condition can be to load the DND library once the web page has finished loading and has become interactive. Another configurable trigger condition can be to load the DND library in response to a particular action performed by a user—e.g., selection of a particular affordance, a mouse click, etc. Still another configurable trigger condition may be time based—i.e., to load the DND library once a predetermined period of time has passed since the webpage was interactive. It will be appreciated that in some examples, the deferred loading module 239 may provide a menu of pre-configured trigger condition to select from. In other examples, web developers may modify the deferred loading module 239 manually to add the required trigger condition.

The product platform 210, client device 220, and DND database 230 communicate data between each other either directly or indirectly through one or more communications networks 240. Communications network 240 may include a local area network (LAN), a public network, or a combination of networks.

It will be appreciated that although FIG. 2 shows a single client device, in reality, multiple client devices can be in communication with the product platform 210 and multiple product platforms 210 can request for and receive the DND library 232 from the DND database 230 at any given time. Further, although the DND database 230 is shown as an independent entity in FIG. 2—this need not be the case in all implementations. In some cases, the DND database 230 may be hosted by the product platform 210. Similarly, although the deferred loading module 239 is shown as part of the DND database 230, this need not be the case. In some embodiments, the deferred loading module 239 may be a separate library provided by the product platform 210 or a different entity and it may be downloaded from that separate entity or the product platform 210 when the webpage is loaded by the client application 222.

The systems and modules described with respect to FIG. 2 are implemented using one or more computer processing systems.

Figure 3:
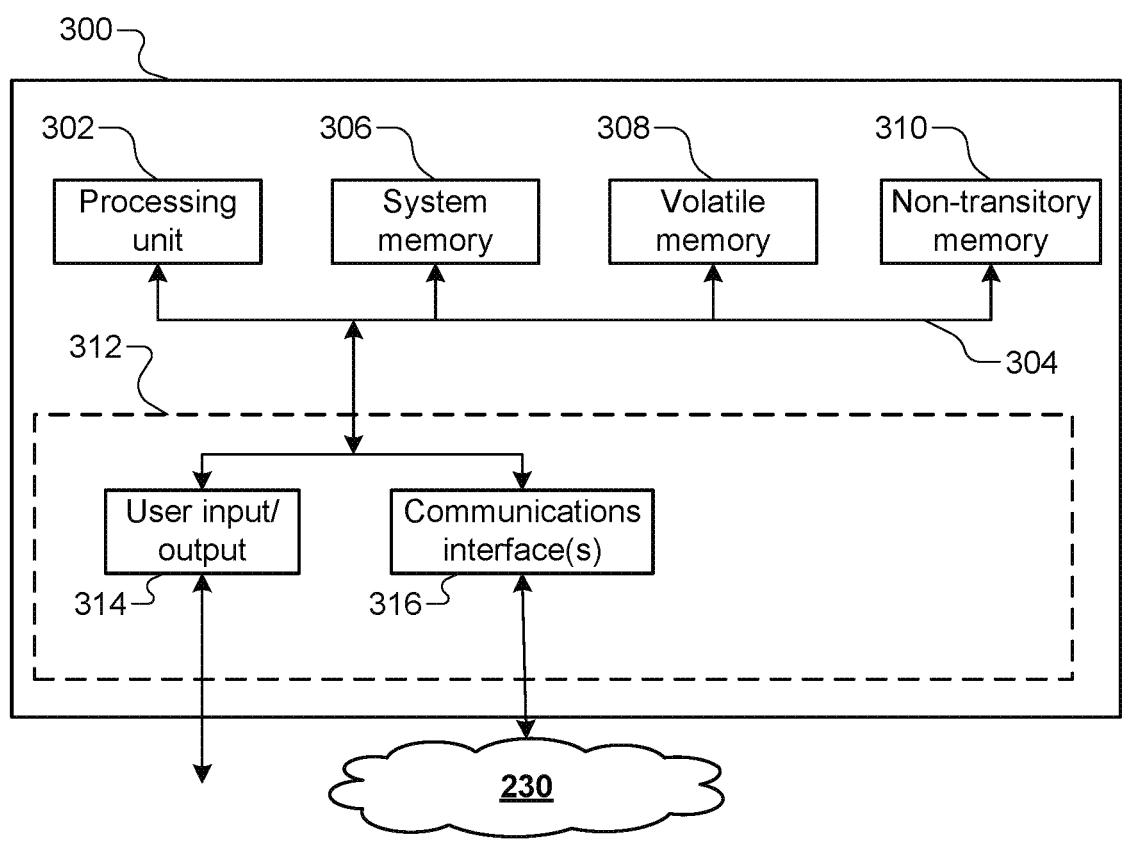
FIG. 3 is a block diagram of a computing system with which various embodiments of the present disclosure may be implemented/configurable to perform various features of the present disclosure.

FIG. 3 provides a block diagram of a computer processing system 300 configurable to implement embodiments and/or features described herein. System 300 is a general-purpose computer processing system. It will be appreciated that FIG. 3 does not illustrate all functional or physical components of a computer processing system. For example, no power supply or power supply interface has been depicted, however system 300 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 300 includes at least one processing unit 302—for example a general or central processing unit, a graphics processing unit, or an alternative computational device). Computer processing system 300 may include a plurality of computer processing units. In some instances, where a computer processing system 300 is described as performing an operation or function all processing required to perform that operation or function will be performed by processing unit 302. In other instances, processing required to perform that operation or function may also be performed by remote processing devices accessible to and useable by (either in a shared or dedicated manner) system 300.

Through a communications bus 304, processing unit 302 is in data communication with one or more computer readable storage devices, which store instructions and/or data for controlling operation of the processing system 300. In this example, system 300 includes a system memory 306 (e.g., a BIOS), volatile memory 308 (e.g., random access memory such as one or more DRAM applications), and non-volatile (or non-transitory) memory 310 (e.g., one or more hard disks, solid-state drives, or other non-transitory computer readable media). Such memory devices may also be referred to as computer readable storage media (or a computer readable medium).

System 300 also includes one or more interfaces, indicated generally by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g., networked) connection.

Wired connection with other devices/networks may be by any appropriate standard or proprietary hardware and connectivity protocols, for example Universal Serial Bus (USB), eSATA, Thunderbolt, Ethernet, HDMI, and/or any other wired connection hardware/connectivity protocol.

Wireless connection with other devices/networks may similarly be by any appropriate standard or proprietary hardware and communications protocols, for example infrared, BlueTooth, Wi-Fi; near field communications (NFC); Global System for Mobile Communications (GSM), Enhanced Data GSM Environment (EDGE), long term evolution (LTE), code division multiple access (CDMA—and/or variants thereof), and/or any other wireless hardware/connectivity protocol.

Generally speaking, and depending on the particular system in question, devices to which system 300 connects—whether by wired or wireless means—include one or more input/output devices (indicated generally by input/output device interface 314). Input devices are used to input data into system 300 for processing by the processing unit 302. Output devices allow data to be output by system 300. Example input/output devices are described below; however, it will be appreciated that not all computer processing systems will include all mentioned devices, and that additional and alternative devices to those mentioned may well be used.

For example, system 300 may include or connect to one or more input devices by which information/data is input into (received by) system 300. Such input devices may include keyboards, mice, trackpads (and/or other touch/contact sensing devices, including touch screen displays), microphones, accelerometers, proximity sensors, GPS devices, touch sensors, and/or other input devices. System 300 may also include or connect to one or more output devices controlled by system 300 to output information. Such output devices may include devices such as displays (e.g., cathode ray tube displays, liquid crystal displays, light emitting diode displays, plasma displays, touch screen displays), speakers, vibration applications, light emitting diodes/other lights, and other output devices. System 300 may also include or connect to devices which may act as both input and output devices, for example memory devices/computer readable media (e.g., hard drives, solid state drives, disk drives, compact flash cards, SD cards, and other memory/computer readable media devices) which system 300 can read data from and/or write data to, and touch screen displays which can both display (output) data and receive touch signals (input).

System 300 also includes one or more communications interfaces 316 for communication with a network, such as network 240 of environment 200. Via a communications interface 316 system 300 can communicate data to and receive data from networked devices, which may themselves be other computer processing systems.

System 300 may be any suitable computer processing system, for example, a server computer system, a desktop computer, a laptop computer, a netbook computer, a tablet computing device, a mobile/smart phone, a personal digital assistant, or an alternative computer processing system.

System 300 stores or has access to computer applications (also referred to as software or programs)—i.e., computer readable instructions and data which, when executed by the processing unit 302, configure system 300 to receive, process, and output data. Instructions and data can be stored on non-transitory computer readable media accessible to system 300. For example, instructions and data may be stored on non-transitory memory 310. Instructions and data may be transmitted to/received by system 300 via a data signal in a transmission channel enabled (for example) by a wired or wireless network connection over interface such as 312.

Applications accessible to system 300 will typically include an operating system application such as Microsoft Windows™, Apple macOS™, Apple iOS™, Android™, Unix™, or Linux™.

System 300 also stores or has access to applications which, when executed by the processing unit 302, configure system 300 to perform various computer-implemented processing operations described herein. For example, and referring to networked environment 200 of FIG. 2 above, client device 220 includes a client application 222 which configures the client device 220 to perform client system operations, and product platform 210 includes server application 212 which configures the server environment computer processing system(s) to perform the described server environment operations.

In some cases, part or all of a given computer-implemented method will be performed by a single computer processing system 300, while in other cases processing may be performed by multiple computer processing systems in data communication with each other.

Example Methods

The following sections describe example methods for loading webpages with the modular DND libraries disclosed herein (method 400), and for performing DND operations with such modular libraries (method 500).

As described previously, different types of draggable objects may exist in webpages including, items in lists, connected lists, cards, images, files, icons, etc. Typically, all images in a webpage are automatically considered "draggable". If developers wish to make any other objects/elements in their webpages draggable, they are usually required to add a draggable property to the corresponding HTML element with the value of true to its HTML page. For example, if the web page is for a virtual board, developers may declare all cards in the web page to be draggable. In addition, developers may specify a drag handle to designate the part of the element that can be used to drag the whole element and one or more conditions to make the element draggable. In addition, developers may associate one or more functions with the draggable elements, such as 'getInitialData( )' that can be used by an adapter to retrieve initial data about the element.

Further, different types of drop targets may exist—e.g., boxes, lists, etc. Again, any object or element can be a drop target. For example, if the web page is for a virtual board, all lists may be drop targets. In addition, the "droppability" of a drop target—the ability of an object to be considered a valid drop target—may be conditional. For instance, a list may be a valid drop target for any cards. However, the same list may not be a valid drop target for other lists (unless combine operations are allowed) or for other entity types, such as files or images. The conditional droppability of drop targets can also be added as a property to the element in the webpage code. Developers may also specify one or more functions, such as 'getData( )' to get data associated with the drop target.

To determine the adapters 236 required for a given webpage, generally speaking, web developers may identify the draggable objects and/or drop target conditions in a webpage. Depending on the identified draggable objects and/or drop target conditions, one or more adapter components may be identified. For instance, if the webpage is meant to only allow files to be dropped in a particular element, the files adapter may be selected. Alternatively, if the webpage is meant to allow elements such as cards to be dropped in other elements such as lists, the elements adapter may be selected.

Similarly, to determine the add-ons that might be useful for a given webpage, developers may consider the type of drag and drop behaviors they are after. For example, if a webpage enables vertical or horizontal reordering of objects in a list, the web developer may determine that in this case, it might be useful to visually indicate where a dragged object will be dropped in a given list of objects. To this end, the web developer may select an add-on that detects edges of objects closest to a dragged object to identify objects in the drop target that are near the cursor. They may also select another add-on component that causes the animation rendering module 225 to display a visual marker (e.g., a line or a placeholder) of a location where an object will be dropped in relation to other objects already present in a drop target if the user drops the object at any given point in the drop target.

In another example, if a webpage enables draggable objects to be combined with drop targets they are dropped on, the web developer may determine that in this case, it might be useful to highlight the drop target when the cursor is over the drop target. In this case, the developer may select the edge detector add-on 238 that detects edges of drop targets closest to a dragged object. As objects will not be placed between other objects, but will be combined with another drop target, there is no need for a visual maker in the drop target. Instead, the drop target on which the cursor is placed during a drag operation may be highlighted using a method provided by the animation-rendering module 225.

In another example, if the webpage enables vertical reordering of objects in a list and the developer anticipates that one or more lists in the webpage may include a large number of cards/objects, the developer may select a scrolling add-on that causes the animation rendering module 225 to render a scroll bar in the list when an item is being dragged in the list and cause the list to automatically scroll up or down depending on the direction of the drag in the list.

Once the adapters 236 and add-ons 238 are selected, they can be retrieved from the DND database 230 along with the core 234 and saved along with webpage data 218 in the storage 216.

It will be appreciated that in some examples, this process of identifying the adapters 236 and/or add-ons 238 for a given webpage may be automatically performed by the DND database 230 or the product platform 210. In this case, the code of the webpage may be parsed by the DND database 230 or the product platform 210 to identify the draggable entities and/or drop target conditions in the code. Depending on these identified objects, the DND database 230 or the product platform 210 may recommend adapters 236 and/or add-ons 238 for the webpage. To do so, the DND database 230 or product platform 210 may maintain a lookup table for different draggable elements and the corresponding recommended adapters 236 and/or add-ons 238. In other examples, the DND database 230 or product platform 210 may utilize a machine-learning model that is trained to determine the appropriate adapters 236 and/or add-ons 238 for a webpage based on training data and/or historical data regarding webpage content and previously selected adapters/add-ons. If a machine-learning model is used, it can automatically detect trends (e.g., uptake of a new adapter component) and may update its recommendations in real time based on these trends.

Figure 4:
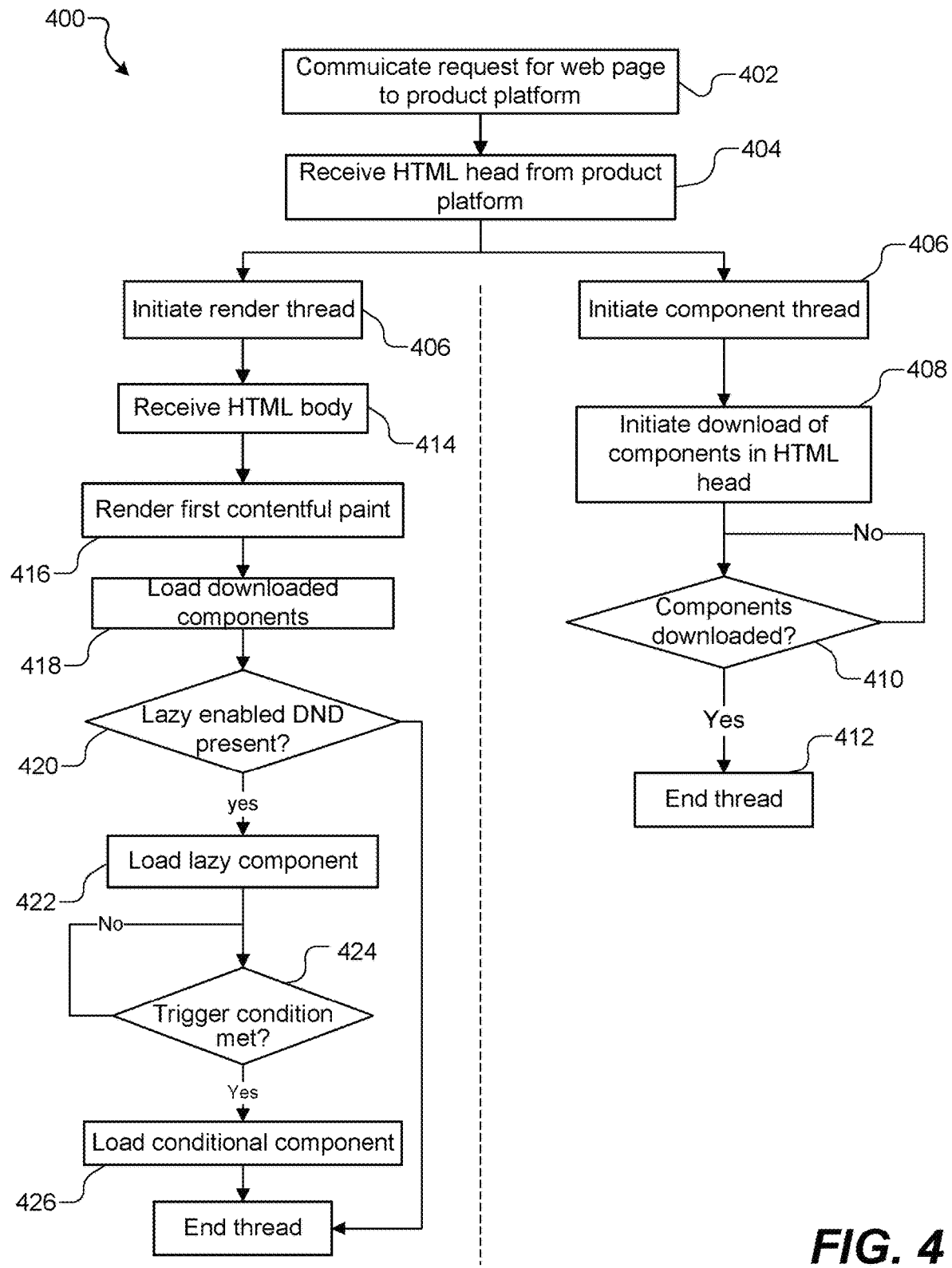
FIG. 4 is a flowchart illustrating an example method for loading a webpage with a modular drag and drop library according to aspects of the present disclosure.

FIG. 4 illustrates an example method for loading a webpage with a modular DND library according to aspects of the present disclosure. As described previously, the modular DND library can be downloaded and executed by a client application 222 before the webpage become interactive or it can be loaded at a later stage. If the modular DND library has to be loaded before the webpage become interactive, information about the library (e.g., URL of the library content) may be provided as part of the HTML head. Otherwise, if the modular DND library can be loaded after the webpage has become interactive, information about the library may be provided as part of the HTML body.

The method commences at step 402, where the client application 222 communicates a request for a webpage to the query handler 213. In some cases, a user may enter a web page URL in a search bar of the web browser 222 or select a particular web page from list of search results. In other cases, the browser 222 may automatically generate and send the web page request, for example, when a user logs into an application hosted by the product platform 210 via a login page. In any event, the web page request includes a URL or any other identifier of the web page. For instance, the web page request may be as follows—

HTTP GET
www.jira.com/issueview

In addition, the web page request may include some information about the client application 222 making the request (e.g., a client application identifier). If the user is logged into the application, the web page request may also include a user identifier of the user and in some cases the tenant identifier of the corresponding tenant (for example, if the product application is a multi-tenanted application).

At step 404, the client application 222 receives the requested webpage data from the query handler 213. To this end, the query handler 213 receives the web page request, retrieves the requested web content, and communicates it to the client application 222. In some examples, the query handler 213 may store web page data 218 in a cache for quick retrieval. In other cases, web page data 218 may be retrieved from storage 216.

Typically, at step 404, the client application 222 receives an HTML head first, which includes a list of the components to be loaded for making the webpage interactive. It then streams the HTML body.

Once the client browser 222 receives the HTML head it performs a number of functions. In particular, it may initiate multiple processing threads—e.g., it may initiate a component processing thread and a render processing thread. Using the component processing thread, the client browser 222 may download one or more components listed in the HTML head. Using the render processing thread, the client browser 222 may render the web page for display on the display of the user device.

For clarity, the operations of the component thread will be described first followed by the operation of the render thread. However, it will be appreciated that the component thread and the rendering thread may perform their respective functions in parallel. If the render thread requires any components downloaded by the component thread, it retrieves the component from the client browser data storage once the component is downloaded.

Once the component thread and the render thread are initiated (at step 406), the method proceeds to step 408, where the component processing thread initiates download of the components received in the HTML head. In one example, the list of components includes the URLs from where the components can be downloaded. The component thread uses these URLs to download the corresponding components. If more than one component is present in the head, the client browser may be configured to download or retrieve the corresponding components in parallel.

At step 410, a check is made to see if the components have downloaded. If there are multiple components, the component thread checks the download status of each of the components and as soon as it determines that a corresponding component has downloaded completely, (yes path from step 414), the component download thread stores the downloaded component in the browser data storage, from where the render processing thread can retrieve the component.

When all components provided as part of the HTML head are downloaded, the component processing thread may be terminated at step 412. If the DND library for the request webpage did not have deferred loading enabled, the DND library is downloaded by the component thread at step 408.

Steps 406-410 are performed by the component processing thread. Now operations of the render thread will be described.

At step 414, the render processing thread receives the HTML body. In some examples, the HTML body may be received a few hundred milliseconds after the HTML head is received. As HTML may be streamed, the client browser receives the HTML body in a stream. As soon as it receives some HTML body text, the client browser begins to generate a document object model (DOM) of all the HTML elements in the stream, a CSS object model (CSSOM) that contains CSS style information that will be applied to DOM elements that is targets, and a render tree (constructed by combining the DOM and CSSOM) for the web page. As soon as some of the render tree is generated, the client browser 222 may initiate painting operations.

At step 416, the render thread renders the first contentful paint (FCP)—i.e., the first non-white canvas on the screen—of the web page. It will be appreciated that the FCP may display all the content, structure, and styling of the web page that is visible on the display screen of the user device. However, it may not include any behavior or interactive functions. That is, the user may be able to read the content of the web page and look at the structure and styling of the web page, but may not be able to select any interactive elements of the web page (such as buttons, checkboxes, tabs, etc.) at this stage.

At step 418, the render thread retrieves downloaded components from the browser data storage and loads them. As described previously, the component thread downloads the components in parallel or sequentially. In any case, some components may finish downloading before other components (e.g., because of the component size). Accordingly, the component processing thread may store the downloaded components in the browser data storage 226 in a staggered fashion—as soon as the corresponding component has finished downloading and therefore, step 418 may be a recurring step, where the render thread retrieves components from the browser data storage 226 until all components have been retrieved.

At step 418, as and when the render processing thread requires components for rendering it retrieves the components from the browser data storage 226 and loads the components-(this may include executing the component code, converting into HTML, adding the converted HTML to the DOM, CSSOM, and render trees and adding the corresponding interactive behavior to the corresponding displayed web page element).

Once all components downloaded by the component thread have been loaded, the web page is considered interactive.

The method then proceeds to step 420 where the render processing thread determines if any deferred loading enabled components are included in the web content—e.g., if the DND library 232 is deferred loading enabled it will be included in the web content. If the render thread determines that a deferred loading enabled DND library is present in the HTML body, the method proceeds to step 422, where the render thread downloads and loads the deferred loading module 239 of the DND library.

This component 239 includes a trigger condition for loading the other DND components. At step 424, a determination is made whether the trigger condition is met. If the trigger condition is not met the method loops at step 424. Alternatively, if a determination is made that the trigger condition is met (e.g., because the user has performed a triggering action, or a predetermined period of time has elapsed), the method proceeds to step 426 where the core 234, one or more adapters 236 and any add-ons 238 present in the DND library are downloaded and loaded.

The method 400 then proceeds to step 428 where the render process is considered completed and the render processing thread is terminated. Returning to step 420, if at this step it is determined that deferred loading is not possible, e.g., because the DND library was not present in the HTML body, the render process is considered completed and the render processing thread is terminated.

In this manner, a webpage with the presently disclosed DND library can be loaded and the DND library can either be loaded before the webpage becomes interactive (in case deferred loading is not enabled) or it can be loaded conditionally at a later time after the webpage has become interactive (in case deferred loading is enabled).

Once the DND library is loaded it is available as DND module 223 in the client application 222.

Figure 5:
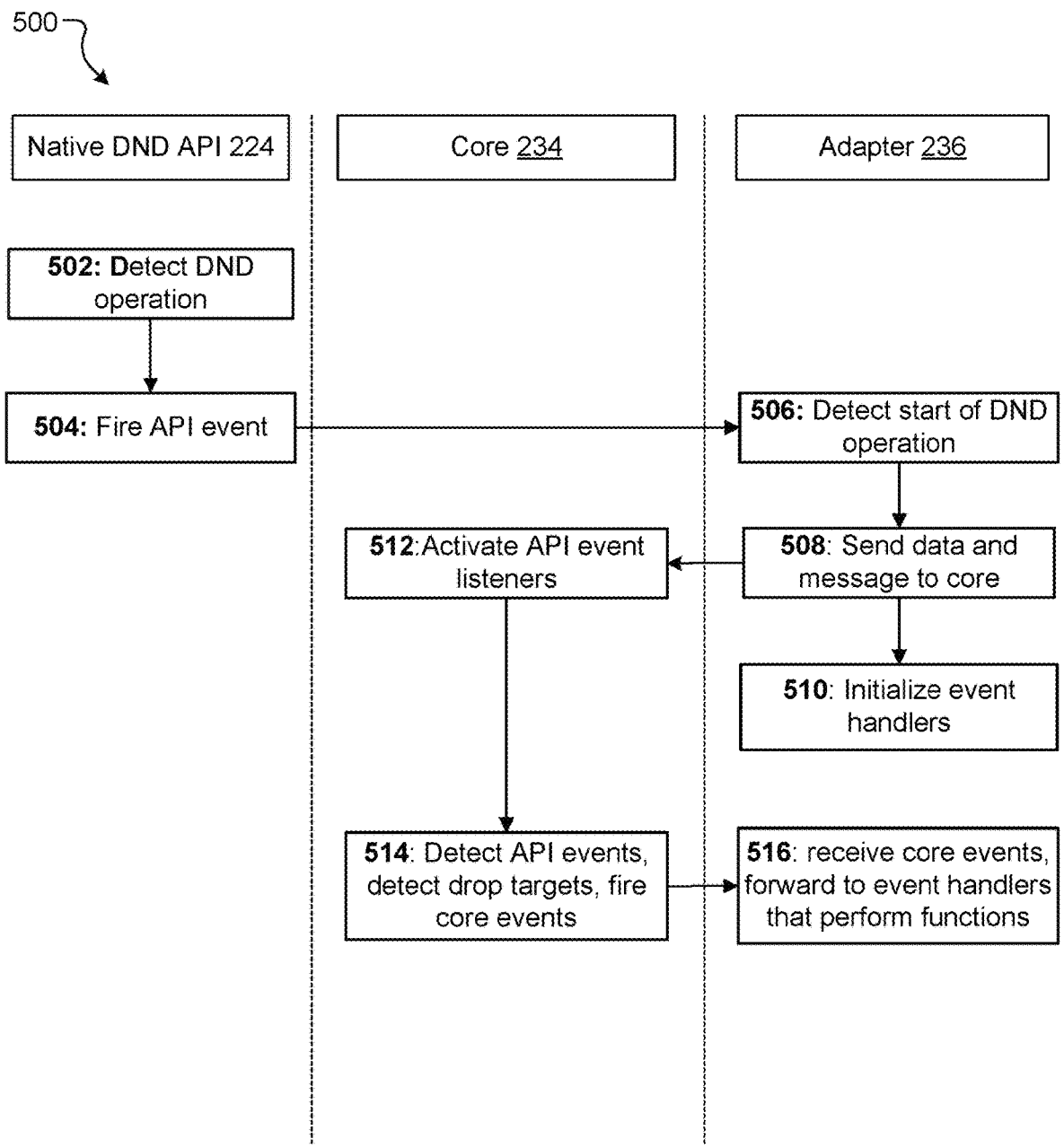
FIG. 5 is a flowchart illustrating an example method for animating a drag and drop operation according to aspects of the present disclosure.

FIG. 5 illustrates an example method 500 for performing a DND operation using the modular DND library of the present disclosure. In this example, for ease of description, it is assumed that the DND module 223 includes a core 234, one adapter 236 for the elements entity type and one add-on 238 for detecting edges of drop targets. However, it will be appreciated that this is merely an example and that the DND module 223 can include multiple adapters and zero or multiple add-ons 238 in other cases. In cases where there are multiple adapters, the operations described herein that are performed on the elements adapter may be performed by each of those adapters.

Method 500 commences at step 502, where the native DND API 224 of the client application 222 detects a DND operation has commenced. For example, the DND API 224 may detect that a user has selected a draggable object using a suitable input control means in the graphical user interface and has commenced dragging that object. In response to this, the native DND API 224 fires an API event—e.g., a dragstart event at step 504. The dragstart event may include an identifier of the entity that is being dragged. If the entity is a webpage element, the dragstart event may include the identifier of the element. Alternatively, if the entity is a file being dragged onto the webpage, the DND API 224 may fire a "dragenter" event.

At step 506, the adapter 236 detects the commencement of the DND operation. Generally speaking, draggable elements may be registered with the adapter 236. In other cases, the adapter 236 may inspect the DOM to determine whether the webpage includes any draggable elements. If the adapter 236 determines that the webpage includes draggable elements (e.g., because they were registered or identified in the DOM), the adapter 236 activates an API event listener on the webpage as soon as the adapter is loaded (e.g., at the end of method 400). Otherwise, if the adapter 236 determines that the webpage does not include any draggable elements, it does not activate any listeners on the webpage when it is loaded.

Accordingly, at step 506, if the API event listener has been activated by the adapter 236, the event listener detects a DND event such as a dragenter or dragstart event. The method then proceeds to step 508, where the adapter 236 determines whether the element associated with the drag event can be dragged (e.g., is it even draggable). To this end, the adapter 236 may compare the identifier of the selected element from the dragstart/dragenter event with a list of draggable items for the webpage (maintained by the adapter 236). If the adapter 236 identifies the selected element in the list of draggable items, it determines that the selected element is draggable. Otherwise, if the adapter 236 does not find the selected element in the list of draggable items, it determines that the selected element is not draggable.

If the adapter 236 determines that the element is not draggable, the method ends. Otherwise, the adapter 236 retrieves information about the selected draggable element (e.g., the element name, identifier and/or any associated properties) from the event that was fired by the native DND API 224. The adapter 236 may then be configured to communicate this to the core 234. In particular, the adapter 236 informs the core 234 that a drag operation has commenced and provides information about the dragged element to the core. In one example, the adapter 236 may provide the following information: an element type and an identifier of the element.

In addition to communicating the dragstart message and draggable element data to the core, the adapter initiates one or more event handlers at step 510. In particular, the adapter initializes a draggable handler that includes information about the selected draggable element, receive events from the adapter 236, and perform one or more functions in relation to the selected draggable element—e.g., perform analytics or cause the animation rendering module 225 to perform an animation. It also initializes one or more drop target handlers that include information about corresponding drop targets and are configured to receive events from the adapter 236 regarding corresponding drop targets and perform one or more functions or operations in relation to the corresponding drop target—e.g., cause an animation rendering module 225 to highlight or un-highlight a corresponding drop target on the screen. In addition, the adapter 236 may initiate a monitor handler that is also configured to receive events from the adapter 236 and perform one or more functions or operations. The drop target handlers may be added or removed depending on the position of the cursor at any given point during a DND operation. In particular, the adapter 236 may initialize a drop target handler per drop target the cursor is over at any given point. For example, if a cursor is over a child drop target that is within a parent drop target, it may initialize two drop target handlers.

At step 512, the core 234 receives the message from the adapter. In response, it initiates and adds one or more event listeners to the webpage that begin to listen to events being fired by the DND API 224. In one example, the core 234 may initiate different event listeners for different types of events. For instance, it may initiate one listener for the drag event, another for the dragenter event, another for the dragover event, yet another for the dragleave event, and still another for the drop or dragend events. Each of these event listeners wait to detect events fired by the native DND API 224 that they are initiated for.

At step 514, one or more of the core's event listeners detect native API events. Depending on the API events that have been detected, the core 234 performs one or more corresponding operations (e.g., by performing a lookup in the event bindings). In particular, depending on the received events, the core 234 may determine the selected drop target(s) at any given point during the DND operation, manage the DND states, and fire its own core events. These core events may be fired on specific pieces depending on whether the events are relevant to those pieces. For instance, if the events are relevant to the draggable element or one or more of the drop targets, the core may fire events for that specific draggable element and those drop targets.

For instance, upon detecting drag events fired by the native API, the core may provide a throttled update of the cursor location. In particular, in response to detecting drag events, the core 234 may generate its own drag events (e.g., at a rate of 60 events/second) that provide the location of the cursor at the rate of 60 times/second to the adapter 236. The adapter may utilize this high fidelity information about the cursor location in case it is used for operations that require the precise location of the cursor during a drag operation—e.g., if the adapter is to cause a line or connection to be drawn between two elements.

In addition, upon detecting dragenter events from the native API 224, the core 234 may be configured to determine whether any drop target hierarchies have changed. For example, consider the situation where the webpage is a virtual board including multiple lists (where each list is a drop target) and each list includes one or more cards (where each card is a drop target as well). In this case, the lists may be considered parent drop targets and the cards may be considered children drop targets. If the cursor is first over a list (but not over any cards in the list), the drop target may be just the parent, i.e., the list. However, when the cursor moves over to a card in the list, the drop target may now be the parent and the child, i.e., the list and the particular card in the list over which the cursor is hovering. In such cases, the core 234 computes any changes in drop target hierarchies based on dragenter and/or dragleave events and may be configured to publish events if the core determines that there has been a change in the drop target hierarchies. This core event "onDropTargetChange" includes information about the changed drop target hierarchies calculated by the core 234.

The core 234 derives two further core events from the onDropTargetChange event—a onDragEnter event and a onDragLeave event. The onDragEnter event is fired when a drop target (e.g., a parent drop target) is entered into for the first time and a onDragLeave event is fired when the cursor leaves a drop target (e.g., a parent drop target).

If the core detects a dragend or drop event fired by the native DND API 224, it will fire a onDrop core event to indicate to the adapter that the user has finished a DND operation. This event may be fired regardless of whether the DND operation ended due to an actual drop or a cancelled DND operation. The event will include data about the location of the cursor when the DND operation was ended. In addition to detecting dragend and drop events, the core may also listen for unexpected events, e.g., pointer move events, that should not occur during a DND operation. If the core 234 detects any such unexpected events, it determines that the DND operation has ended and fires an onDrop event to indicate to the adaptor that the DND operation has ended. This way, even if the native DND API is inconsistent with these events or misses triggering the drop event, the core 234 can remedy this error such that the adaptor and any consumers of the events are not affected by the native DND API's errors.

It will be appreciated that all the events generated by the core 234 follow the same order. In particular, the core may first fire an event for the draggable element, and then for the drop targets (in order of reverse hierarchy) and then for any other monitors initiated by the adapter 236. It will be appreciated that when the event is a dropTargetChange event, the event fires first on all previous drop targets in reverse hierarchical order and then on any new current drop targets in reverse hierarchical order.

Further, all events fired by the core 234 include at least some common data (referred to as base data here) and may include additional data relevant to specific events. The base data may include input data, drag location data and drag location history data. The input data may include user input (e.g., alt key, button, ctrl key, meta key, shift key, etc.) and coordinates in terms of the display port of the client device and in terms of the webpage. The drag location data may include any drop targets the cursor is currently over and the drag location history may include information about any initial drop targets, any current drop targets, and a list of all previous drop targets the cursor was over. In addition to this, the base data includes information about the draggable element. As this may be different for different entity types, the information about the draggable element may be provided differently based on the entity being dragged. For example, if the entity is an element, the base data includes the element identifier, its drag handle and any data associated with the element.

In addition to the data received along with the events, each drop target may add a self property that includes information about the drop target that the event is firing on. This data may include information about the drop target such as element identifier, any data associated with the element, and any drop effects associated with the drop target. In some cases, the drop effects may be provided by add-ons 238.

At step 516, the adapter 236 detects the core events and forwards the events to the relevant event handlers. For example, it forward core events related to the draggable element to the draggable event handler, forwards core events related to the one or more drop targets to the corresponding drop target handlers and forwards any other core events to the monitor event handler in that particular order in some embodiments.

Generally speaking, the core events inform the adapter 236 and the corresponding event handlers of the particular drop targets the cursor is currently over, was previously over, and allows the corresponding event handlers to perform certain functions based on this information. In one example, if one or more add-ons are provided, one or more of the event handlers may forward the one or more core events to the add-ons. For example, when the edge detection add-on is utilized and when one or more drop target event handler receive the drag, dropTargetChange, DragEnter or DragLeave core events related to that corresponding drop target, the drop target handler corresponding to the current child drop target may forward information such as the current cursor location to the edge detection add-on. The edge detection add-on may then determine which edge of the drop target the cursor is closest to and provide this output to the animation-rendering module 225. The animation-rendering module 225 in turn may highlight the identified edge.

In addition to communicating with add-ons, the event handlers may communicate with the animation-rendering module 225 in response to receiving the core events and may cause the animation-rendering module 225 to render animations in response to detecting certain events. For example, when the dragstart event is first detected, the draggable event handler may change the state of the draggable element from "idle" to "generate review" and communicate this state of the draggable element with the animation rendering module 225, which may in turn, update the display to indicate that a DND operation has commenced and a draggable element has been selected.

Figure 6A:
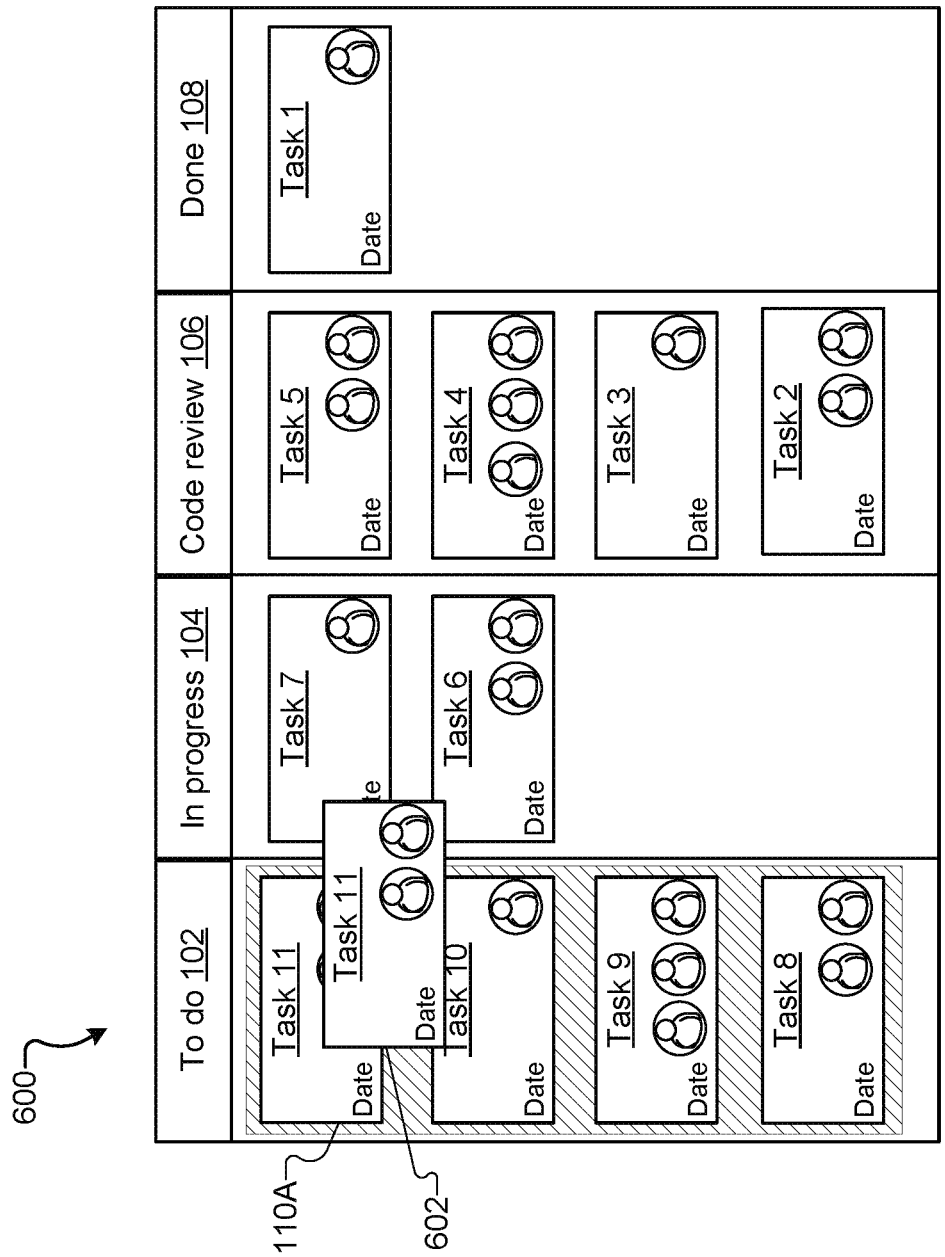
FIG. 6A is a diagram of a virtual board during a DND operation at a first time according to aspects of the present disclosure.

FIG. 6A depicts this animation performed by the animation-rendering module 225, where the translucency of the original dragged card 110A is increased but the item remains in its original location while a ghost image 602 having a lower translucency is attached to the cursor position. In this case, as the object is also over a drop target (e.g., the TO DO list 102), the adapter 236 may also communicate this information to the animation rendering module 225, which highlights the entire TO DO list 102 in a color.

Figure 6B:
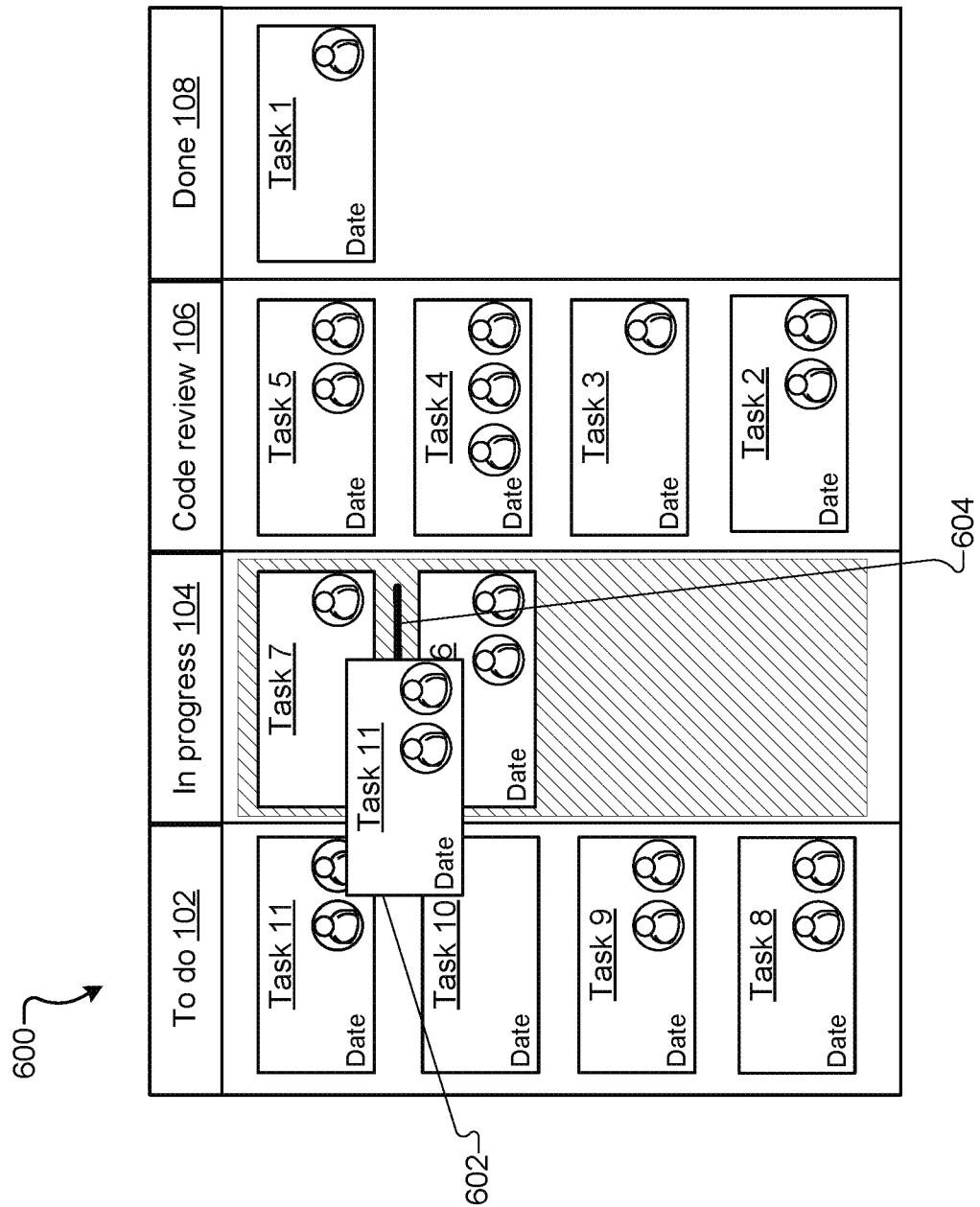
FIG. 6B is a diagram of a virtual board during a DND operation at a second time according to aspects of the present disclosure.

In the example depicted in FIG. 6A, the user may continue to move the cursor over to the second column—i.e., the IN PROGRESS list 104. In this case, the native DND API may fire multiple dragover events while the cursor is still over the TO DO list 102, fire a drag leave event when the cursor moves out of the TO DO list, fire a dragenter event when it is in the IN PROGRESS list and fire multiple dragover events until the cursor enters the element TASK 7. At this stage is also fires another dragenter event. In response to the dragover events, the core fires multiple drag events. In response to the dragleave event, it fires a dropTargetChange event and a dropTargetLeave event. In response to the dragenter event is fires a droptargetchange event and a dropTargetEnter event and then fires multiple drag events in response to the dragover events. The adapter 236 keeps communicating these events to the corresponding draggable element, drop target, and monitor event handlers. And one or more of these event handlers communicate with the animation-rendering module 225 in response to each of these events. For example, the draggable event handler may notifying the animation rendering module 225 of the position of the cursor so that the animation rendering module 225 can move the cursor and ghost image 602 as requested by the user. One or more of the drop target handlers may communicate with the animation rendering module 225 in response to the dropTargetChange, dropTargetEnter and/or dropTargetLeave events, such that the animation rendering module 225 can stop highlighting the TO DO list 102 and highlight the IN PROGRESS list 104 when the drop target changes, and render a line to show when the ghost image 602 would be dropped if the DND operation ended at this stage. FIG. 6B depicts this state. In this case, the cursor is over the IN PROGRESS list 104 and TASK 7 (in particular towards the bottom edge of the TASK 7 card). Accordingly, in this case, the adapter 236 causes the animation rendering module 225 to render a line 604 between the TASK 7 and TASK 6 cards to visually indicate where the card will be positioned if it is dropped at this point.

Similarly, in another example, the draggable event handler may receive a core event indicating the draggable element has been dropped on a valid drop target. In this case, the draggable event handler may change the state of the draggable element from "dragging" to "idle" and may communicate this state change to the animation rendering module 225, which may be configured to stop showing the ghost image and drop the draggable element in the current location.

It will be appreciated that these are examples, and the event handlers may be programmed to perform any operations or analytics in response to the events received from the core component 234 without departing from the scope of the present disclosure.

Although aspects of the present disclosure are described with reference to an object tracking application, it will be appreciated that this need not be the case. Aspects of the present application can be implemented in user interfaces associated with other types of software applications. For example, aspects of the present disclosure can be used in user interfaces associated with software applications that display interactive data in the form of tables, grids, or lists with interactive or movable objects (such as cells, rows, columns, values) within the tables, grids, or lists.

The flowcharts illustrated in the figures and described above define operations in particular orders to explain various features. In some cases, the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Although the present disclosure uses terms "first," "second," etc. to describe various elements, these terms are used only to distinguish elements from one another and not in an ordinal sense.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage, or attribute that is not expressly recited in a claim should be considered as a required or essential feature. Accordingly, the specification and drawings are to be regarded in an illustrative rather than a restrictive sense.

What is claimed is:

1. A computer-implemented method comprising:
   in response to a commencement of a drag and drop operation on a selected draggable entity in a web browser, receiving at a core component of a drag and drop library, a message indicating the commencement of the drag and drop operation and including first information about the selected draggable entity;
   in response to receiving the message, activating, by the core component, one or more application programming interface (API) event listeners to detect one or more API events fired by a native drag and drop API of the web browser;
   detecting, by the core component, the one or more API events;
   in accordance with detecting the one or more API events, computing, by the core component, one or more drop targets in the web browser for the selected draggable entity;
   firing, by the core component, one or more core events in response to computing the one or more drop targets; and
   forwarding the one or more core events to one or more event handlers, the one or more event handlers configured to receive the one or more core events and perform one or more operations in response to the one or more core events.

2. The computer-implemented method of claim 1, wherein the commencement of the drag and drop operation is detected in response to detecting an API event generated by the native drag and drop API of the web browser.

3. The computer-implemented method of claim 1, wherein the one or more event handlers include:
   a draggable event handler including second information about the selected draggable entity and configured to receive the one or more core events and perform one or more functions corresponding to the selected draggable entity; and
   one or more drop target handlers, each drop target handler related to one of the one or more drop targets computed by the core component, each drop target handler including information about a related drop target, and configured to receive the one or more core events and perform one or more functions corresponding to the related drop target.

4. The computer-implemented method of claim 3, wherein the one or more event handlers further include one or more monitor event handlers configured to receive the one or more core events and perform one or more operations in relation to the drag and drop operation.

5. The computer-implemented method of claim 1, wherein the computing the one or more drop targets comprises determining drop target hierarchies and changes in the drop target hierarchies based on the one or more API events.

6. The computer-implemented method of claim 1, wherein each of the one or more core events includes base data including information about any drop targets a cursor is currently over and information about any previous drop targets the cursor was over, and coordinates of the cursor in terms of a display port of a client device and in terms of a webpage displayed in the web browser.

7. The computer-implemented method of claim 1, wherein the drag and drop library is loaded after the web browser loads a webpage associated with the drag and drop library.

8. The computer-implemented method of claim 7, wherein the drag and drop library is loaded when a trigger condition is met.

9. The computer-implemented method of claim 1, wherein the one or more event handlers are configured to communicate the one or more core events to an animation rendering module of the web browser that is configured to render animations in response to the drag and drop operation on a display of a user device.

10. The computer-implemented method of claim 1, wherein the one or more event handlers is configured to communicate the one or more core events to an add-on component for performing one or more additional operations based on the one or more core events.

11. A non-transitory computer readable medium comprising a drag and drop library, the drag and drop library comprising a core component, wherein when the core component is executed by a processing unit, it causes the processing unit to:

receive a message indicating commencement of a drag and drop operation on a selected draggable entity in a web browser, in response to receiving the message, activate one or more application programming interface (API) event listeners to detect one or more API events fired by a native drag and drop API of the web browser;

detect the one or more API events;

in response to detecting the one or more API events, compute one or more drop targets in the web browser for the selected draggable entity; and fire one or more core events in response to computing the one or more drop targets; and perform, by the processing unit, one or more operations in response to the one or more core events.

12. The non-transitory computer readable medium of claim 11, wherein the processing unit is configured to:

detect commencement of the drag and drop operation on the selected draggable entity in a web browser; and communicate a message to the core component indicating the commencement of the drag and drop operation and including information about the selected draggable entity.

13. The non-transitory computer readable medium of claim 12, wherein the processing unit detects the commencement of the drag and drop operation in response to detecting an API event generated by the native drag and drop API of the web browser.

14. The non-transitory computer readable medium of claim 11, wherein computing the one or more drop targets comprises determining drop target hierarchies and changes in the drop target hierarchies based on the one or more API events.

15. The non-transitory computer readable medium of claim 11, wherein each of the one or more core events includes base data including information any drop targets a cursor is currently over and information about any previous drop targets the cursor was over, and coordinates of the cursor in terms of a display port of a client device and in terms of a webpage displayed in the web browser.

16. The non-transitory computer readable medium of claim 11, further comprising instructions which when executed by the processing unit cause the drag and drop library to be loaded after the web browser loads a webpage associated with the drag and drop library.

17. The non-transitory computer readable medium of claim 11, further comprising instructions which when executed by the processing unit cause the drag and drop library to be loaded when a trigger condition is met.

18. The non-transitory computer readable medium of claim 11, wherein the processing unit is configured to:

initialize one or more event handlers including:

a draggable event handler including information about the selected draggable entity and configured to receive the one or more core events and perform one or more functions corresponding to the selected draggable entity, and one or more drop target handlers, each drop target handler related to one of the one or more drop targets computed by the core component, including information about a related drop target, and configured to receive the one or more core events and perform one or more functions corresponding to the related drop target.

19. The non-transitory computer readable medium of claim 18, wherein the one or more event handlers are configured to communicate the one or more core events to an animation rendering module of the web browser that is configured to render animations in response to the drag and drop operation on a display of a user device.

20. The non-transitory computer readable medium of claim 18, wherein the one or more event handlers is configured to communicate the one or more core events to an add-on component for performing one or more additional operations based on the one or more core events.

* * * * *